(12) United States Patent
Gill

(10) Patent No.: US 9,028,747 B2
(45) Date of Patent: May 12, 2015

(54) CORROSION AND FOULING MITIGATION USING NON-PHOSPHORUS BASED ADDITIVES

(71) Applicant: Ecolab USA Inc., Eagan, MN (US)

(72) Inventor: Jasbir S. Gill, Naperville, IL (US)

(73) Assignee: Ecolab USA Inc., Naperville, IL (US)

(*) Notice: Subject to any disclaimer, the term of this patent is extended or adjusted under 35 U.S.C. 154(b) by 28 days.

(21) Appl. No.: 13/730,523

(22) Filed: Dec. 28, 2012

(65) Prior Publication Data

US 2014/0186210 A1    Jul. 3, 2014

(51) Int. Cl.

| | |
|---|---|
| C23F 11/00 | (2006.01) |
| C09K 13/00 | (2006.01) |
| C09K 3/00 | (2006.01) |
| A61L 9/01 | (2006.01) |
| C02F 5/08 | (2006.01) |
| B08B 7/00 | (2006.01) |
| C23F 11/14 | (2006.01) |
| C23F 11/18 | (2006.01) |
| C02F 5/12 | (2006.01) |
| C23F 11/08 | (2006.01) |
| C02F 1/68 | (2006.01) |
| C02F 103/32 | (2006.01) |
| C02F 103/36 | (2006.01) |

(52) U.S. Cl.
CPC ............... *C23F 11/149* (2013.01); *C23F 11/18* (2013.01); *C02F 5/125* (2013.01); *C23F 11/08* (2013.01); *C02F 2103/32* (2013.01); *C02F 2103/36* (2013.01); *C02F 2303/08* (2013.01); *C02F 1/68* (2013.01); *C02F 2209/005* (2013.01); *C02F 2209/008* (2013.01); *C02F 2209/02* (2013.01); *C02F 2209/04* (2013.01); *C02F 2209/06* (2013.01); *C02F 2209/11* (2013.01); *C02F 2209/40* (2013.01)

(58) Field of Classification Search
CPC ........... A01N 33/00; C23F 4/00; C23F 11/00; C23F 15/00
USPC ................. 422/1, 6–7, 12–13; 252/79.1, 175, 252/186.1, 380; 424/76.8, 617; 510/108, 510/247; 134/6, 26; 210/749
See application file for complete search history.

(56) References Cited

U.S. PATENT DOCUMENTS

| | | | |
|---|---|---|---|
| 4,964,468 | A | 10/1990 | Adams et al. |
| 5,066,199 | A | 11/1991 | Reese et al. |
| 5,195,879 | A | 3/1993 | Reese et al. |
| 5,302,253 | A | 4/1994 | Lessard et al. |
| 5,324,665 | A | 6/1994 | Lessard |
| 5,326,482 | A | 7/1994 | Lessard et al. |
| 5,702,631 | A | 12/1997 | Conville et al. |
| 5,776,875 | A | 7/1998 | Tang et al. |
| 6,228,283 | B1 | 5/2001 | Turcotte et al. |

(Continued)

FOREIGN PATENT DOCUMENTS

EP    0516382 B1    2/1997

*Primary Examiner* — Monzer R Chorbaji
(74) *Attorney, Agent, or Firm* — Senniger Powers LLP

(57) ABSTRACT

Water treatment compositions are provided that are effective for mitigating corrosion or fouling of surfaces in contact with aqueous systems. The water treatment compositions can include one or more azole compounds, one or more transition metals, and one or more dispersants, in addition to various other additives. The water treatment compositions can exclude phosphorus and still be effective. Methods for mitigating corrosion or fouling of a surface in an aqueous system are also provided.

19 Claims, 1 Drawing Sheet

(56) References Cited

U.S. PATENT DOCUMENTS

| | | |
|---|---|---|
| 6,556,027 B2 | 4/2003 | Banks |
| 6,685,840 B2 | 2/2004 | Hatch |
| 6,845,336 B2 | 1/2005 | Kodukula et al. |
| 7,955,853 B2 | 6/2011 | Hicks et al. |
| 8,068,033 B2 | 11/2011 | Blokker et al. |
| 8,130,106 B1 | 3/2012 | Hicks et al. |
| 2005/0023506 A1* | 2/2005 | Someya et al. ............... 252/388 |
| 2009/0069202 A1 | 3/2009 | Stapp et al. |
| 2010/0108566 A1 | 5/2010 | Scattergood et al. |
| 2011/0033337 A1* | 2/2011 | Burba et al. .................... 422/26 |
| 2012/0234756 A1 | 9/2012 | Hicks et al. |

* cited by examiner

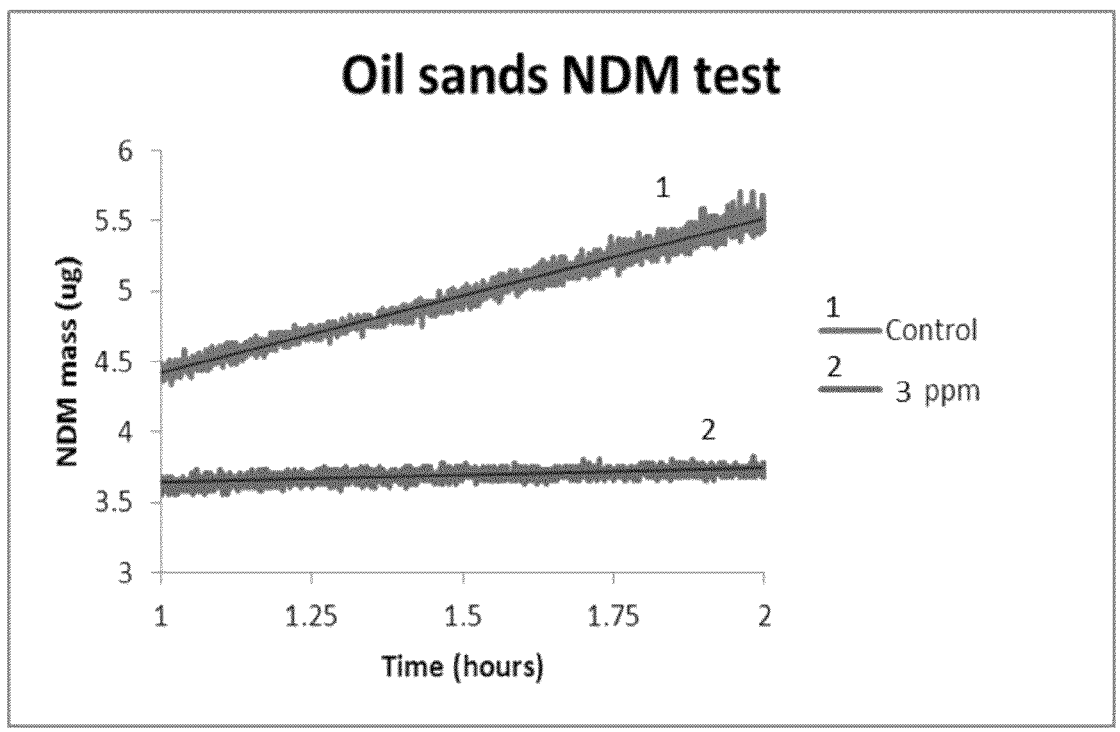

CORROSION AND FOULING MITIGATION USING NON-PHOSPHORUS BASED ADDITIVES

CROSS-REFERENCE TO RELATED APPLICATIONS

Not applicable

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING, A TABLE, OR A COMPUTER PROGRAM

Not applicable.

BACKGROUND OF THE INVENTION

1. Field of the Invention

The disclosure pertains to compositions and methods useful for controlling corrosion. In particular, the disclosure pertains to corrosion control compositions that do not include any phosphorus and methods of mitigating corrosion of metals in corrosive aqueous systems.

2. Description of the Related Art

Corrosion of metal surfaces in aqueous media has long been a problem for industries such as the oil and gas industry, food/beverage industry, wash/sanitizing industry, pulp and paper, power generation, manufacturing, and utilities. For example, it is well known that during the production of oil and gas several other corrosive components are present such as brines, organic acids, carbon dioxide, hydrogen sulfide, and microorganisms. These aggressive constituents can cause severe corrosion as evidenced by surface pitting, embrittlement, and general loss of metal. The metallic surfaces can be composed of high alloy steels including chrome steels, ferritic alloy steels, austenitic stainless steels, precipitation-hardened stainless steels, and high nickel content steels, copper, and carbon steels.

In the food/beverage and wash/sanitizing industry, solutions such as sodium hypochlorite solutions are commonly used and are highly effective as bleaches and sanitizers for cleaning a variety of surfaces. However, sodium hypochlorite solutions are corrosive to many treated surfaces, in particular, metal surfaces become highly corroded.

There are several mechanisms responsible for corrosion of metals. In corrosive water systems, the overall corrosion rate is controlled by the reduction of oxygen inhibiting the cathodic reaction. However, the most robust and cost effective water treatment programs include both anodic and cathodic inhibitors to block reactions at both the anode and the cathode.

Mitigation of corrosion and fouling is essential in all water based or aqueous systems. In the prior art, most of the additives that are commonly used for corrosion and fouling mitigation include phosphorus, such as orthophosphates, polyphosphates, or organic phosphates commonly known as phosphonates. While there has been some success attributed to phosphorus containing corrosion and fouling inhibitor compositions, it has recently been discovered that phosphorus is not environmentally friendly and thus environmental agencies have either mandated a reduction in its use or banned its use altogether.

As such, there exists a need for corrosion and fouling mitigating compositions that do not include phosphorus, and methods for providing corrosion or fouling mitigation using such non-phosphorus containing compositions.

BRIEF SUMMARY OF THE INVENTION

Water treatment compositions useful for mitigating fouling and corrosion are disclosed. The water treatment compositions can include one or more azole compounds, one or more transition metals, and one or more dispersants. The water treatment compositions can exclude, or not comprise, phosphorus.

Methods for mitigating corrosion and fouling of a surface in an aqueous system are also disclosed. The methods can include the steps of providing a housing having at least one metal surface, introducing an aqueous medium into the housing, and injecting a water treatment composition comprising an effective amount of one or more azole compounds, an effective amount of one or more transition metals, and an effective amount of one or more dispersants into the aqueous medium. The water treatment compositions can exclude, or not comprise, phosphorus.

In another aspect, the present disclosure provides an automated, on-line method of monitoring and controlling one or more properties of water. The method comprises:

(a) providing a storage device;

(b) introducing water into the storage device;

(c) providing a monitoring and controlling unit comprising a controller and a plurality of sensors in communication with the controller, wherein each of the plurality of sensors is operable to measure a property of the water;

(d) providing one or more pumps, which are in communication with the controller, wherein the one or more pumps can comprise one or more chemical injection pumps;

(e) inputting an acceptable range for each of the one or more properties of the water to be measured into the controller;

(f) providing a delivery conduit having a first end in communication with the water in the storage device and a second end connected to an inlet of the monitoring and controlling unit;

(g) pumping a sample of water from the storage device into the monitoring and controlling unit;

(h) measuring one or more properties of the sample of water with the plurality of sensors;

(i) adding a water treatment composition substantially free of phosphorus to the water in the storage device via a chemical injection pump;

(j) determining if the measured one or more properties of the sample of production water is within the acceptable range inputted into the controller in step (e); wherein (k) if the measured one or more properties is outside of the acceptable range associated with that property inputted in step (e), causing a change in an influx of a chemical into the water from the one or more chemical injection pumps, the chemical being capable of adjusting the measured property associated with the water in a manner to bring the measured property within the acceptable range; and (l) optionally repeating steps (a) to (k) to determine if the one or more properties has been brought within the acceptable range inputted in step (e).

Any of the methods recited herein can also include the step of pretreating the at least one metal surface with a water treatment composition excluding phosphorus, as disclosed herein.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE SEVERAL VIEWS OF THE DRAWINGS

A detailed description of the invention is hereinafter described with specific reference being made to the drawings in which:

FIG. 1 shows a graph depicting a comparison of weight gain on a quartz crystal microbalance over time with a system incorporating a mixture of a polymaleic acid dispersant and a copolymer dispersant of acrylic acid and AMPS, compared to a control system that does not include these dispersants.

DETAILED DESCRIPTION OF THE INVENTION

The present disclosure provides a treatment including compositions and methods useful for mitigating corrosion and fouling in aqueous media. This treatment eliminates the need to use phosphorus containing compositions.

As used herein, "corrosion inhibitor" is intended to refer to at least one of, or any combination of, the disclosed corrosion inhibitors, corrosion inhibitor intermediates, and corrosion inhibitor product formulations. These compounds can also be referred to as water treatment compositions.

In an aspect, this disclosure provides water treatment compositions that are useful for inhibiting or mitigating corrosion and fouling of surfaces contacting, containing, or housing a water-based or aqueous system.

In certain aspects, the water treatment compositions are substantially free of phosphorus. In the present application, the term "phosphorus" is intended to include not only phosphorus, but also phosphorus bearing additives, phosphorus derivatives, etc. In other aspects, the compositions do not include any phosphorus.

The presently disclosed water treatment compositions can include one or more azole compounds. Azoles are commonly known in the art and any azole, or combination of azoles, can be selected in accordance with the present disclosure. An azole is a class of five-membered nitrogen heterocyclic ring compounds containing at least one other non-carbon atom, such as nitrogen, sulfur, or oxygen. Non-limiting illustrative examples of azoles that can be included in the presently disclosed water treatment compositions are alkyl-substituted azoles, pyrazole, imidazole, thiazole, oxazole, isoxazole, butylbenzotriazoles, tolyltriazole, and any combination thereof. For example, in certain aspects, the water treatment composition comprises tolyltriazole and excludes phosphorus. In other aspects, the water treatment composition comprises a mixture of two or more azoles, such as a mixture of tolyltriazole and a butylbenzotriazole, and excludes phosphorus.

Azoles can be present in the disclosed water treatment compositions in amounts ranging from about 1 ppm to about 100 ppm. For example, the presently disclosed water treatment compositions can include from about 2 ppm to about 10 ppm of one or more azoles, or from about 3 ppm to about 25 ppm of one or more azoles, or from about 10 ppm to about 50 ppm of one or more azoles, or any subcombination within the range of about 2 ppm to about 100 ppm of one or more azoles. In certain aspects, the presently disclosed water treatment composition comprises about 4 ppm of tolyltriazole and excludes phosphorus. In other aspects, the presently disclosed water treatment composition comprises about 3 ppm of a mixture of a butylbenzotriazole and tolyltriazole, while excluding phosphorus.

Moreover, in certain aspects, the water treatment compositions can also include one or more dispersants. The dispersant can be, for example, any polymer, copolymer, terpolymer, etc., comprising acrylic acid, maleic acid, or polymaleic acid with sulfonated monomers, and any combination thereof. An example of such a dispersant is a copolymer of acrylic acid and 2-acrylamido-2-methylpropane sulfonic acid (AMPS). Another example of such a dispersant is a copolymer of maleic acid and AMPS. An additional example of such a dispersant is a terpolymer of acrylic acid, sulfonated acrylamide, and AMPS. Thus, in an aspect, the presently disclosed water treatment composition can include a dispersant comprising acrylic acid and excluding phosphorus. In another aspect, the presently disclosed water treatment composition can include a dispersant comprising polymaleic acid and a copolymer of acrylic acid and AMPS, while excluding phosphorus.

The dispersant can be present in the water treatment composition in amounts ranging from about 2 ppm to about 50 ppm. For example, the dispersant can be present in amounts ranging from about 3 ppm to about 10 ppm, or about 10 ppm to about 20 ppm, or about 20 ppm to about 30 ppm, or any range or sub-range thereof. Thus, in an aspect, the presently disclosed water treatment composition can include a dispersant comprising about 3 ppm of a mixture of polymaleic acid and a copolymer of acrylic acid and AMPS, while excluding phosphorus.

Furthermore, in certain aspects, the water treatment compositions disclosed herein can also include one or more transition metals. Transition metals are commonly known in the art and are labeled as such in the periodic table of the elements. An example of a transition metal is zinc. Thus in one aspect of the present disclosure, the water treatment composition comprises zinc and excludes phosphorus.

The one or more transition metals can be present in the water treatment compositions in amounts ranging from about 1 ppm to about 5 ppm. Thus, in certain aspects, the water treatment composition can include from about 1 ppm to about 3 ppm of one or more transition metals, or from about 2 ppm to about 4 ppm of one or more transition metals, or any range or sub-range thereof. For example, in one aspect, the water treatment composition comprises about 2 ppm of zinc and excludes phosphorus. In another aspect, the water treatment composition comprises about 4 ppm of zinc and excludes phosphorus.

In certain aspects, other components can be present in the water treatment compositions such as one or more quaternary ammonium salts and sodium meta silicates, excluding phosphorus.

In accordance with the present disclosure, a particular embodiment of a water treatment composition comprises zinc, a dispersant comprising a mixture of polymaleic acid and a copolymer of acrylic acid and AMPS, and tolyltriazole, excluding phosphorus. In an aspect, the water treatment composition comprises about 4 ppm of zinc, about 4 ppm of a dispersant comprising a mixture of polymaleic acid and a copolymer of acrylic acid and AMPS, and about 4 ppm of tolyltriazole, excluding phosphorus.

In an alternate embodiment, the water treatment composition comprises zinc, a dispersant comprising a mixture of polymaleic acid and a copolymer of acrylic acid and AMPS, and a mixture of a butylbenzotriazole and tolyltriazole, excluding phosphorus. In an aspect, the water treatment composition comprises about 4 ppm of zinc, about 4 ppm of a dispersant comprising a mixture of polymaleic acid and a copolymer of acrylic acid and AMPS, and about 3 ppm of a mixture of a butylbenzotriazole and tolyltriazole, excluding phosphorus.

Although certain water treatment compositions have been used in the prior art for mitigating corrosion of metal surfaces such as steel, the present inventors have unexpectedly discovered that the water treatment compositions disclosed herein are effective for inhibiting or mitigating corrosion and fouling of steel, galvanized steel or carbon steel surfaces, in addition to copper and copper alloy surfaces.

The present inventors have also discovered an unexpected synergy between certain azole compounds with zinc, and certain combinations of azole compounds with zinc. The synergy is shown in the examples in the present application.

Not only are the presently disclosed water treatment compositions useful for inhibiting or mitigating corrosion of surfaces, they are also effective for mitigating or inhibiting fouling of surfaces. Surfaces to be treated with the presently disclosed water treatment compositions can be any surface referred to or present in any of the aqueous or water systems referred to in the background section of the present application, in addition to any other surface that could come into contact with an aqueous medium. For example, the presently disclosed water treatment compositions can be successfully used in the challenging environment of recycling pond water used in oil sands operations, as will be shown in the examples in the present application.

Methods of mitigating or inhibiting corrosion of surfaces are also covered by the present disclosure, in addition to methods of inhibiting or mitigating fouling of surfaces. In all cases, aqueous systems are provided and the aqueous medium is housed within or contacting various surfaces of the housing. The housing can be, for example, a pipe or conduit transporting the aqueous medium to a desired location. The housing can also be, for example, a container storing recycling pond water or heat exchangers in an oil sands operation or other processes. In accordance with the present disclosure, the surface to be treated can be any surface that comes into contact with an aqueous medium where fouling or corrosion is capable of occurring.

In one aspect, a method is disclosed for mitigating corrosion of one or more surfaces of a metal housing, which can be a container, a conduit, a heat exchanger, and the like. The method can include the steps of providing a housing having one or more metal surfaces, introducing an aqueous medium into the housing, and injecting an effective amount of one or more of the presently disclosed water treatment compositions into the aqueous medium. The one or more metal surfaces can be, for example, copper or a copper alloy. The one or more metal surfaces can also be steel, carbon steel, galvanized steel, etc. The method can also include a step of pretreating the one or more metal surfaces with an effective amount of one or more of the presently disclosed water treatment compositions before introducing the aqueous medium into the housing. This pretreatment step can be accomplished, for example, by spraying the water treatment composition onto the surface or dipping the surface into a solution comprising the water treatment composition. If this step is included in the method, the method can still comprise the step of injecting an effective amount of one or more of the presently disclosed water treatment compositions into the aqueous medium after the one or more metal surfaces are pretreated with an effective amount of one or more of the presently disclosed water treatment compositions. According to this method, corrosion of one or more surfaces of the metal housing will be mitigated.

In another aspect, a method is disclosed for mitigating fouling of one or more surfaces of a metal housing, which can be a container, a conduit, a heat exchanger, and the like. The method can include the steps of providing a housing having one or more metal surfaces, introducing an aqueous medium into the housing, and injecting an effective amount of one or more of the presently disclosed water treatment compositions into the aqueous medium. The one or more metal surfaces can be, the example, copper or a copper alloy. The one or more metal surfaces can also be steel, carbon steel, galvanized steel, etc. The method can also include a step of pretreating the one or more metal surfaces with an effective amount of one or more of the presently disclosed water treatment compositions before introducing the aqueous medium into the housing. If this step is included in the method, the method can still comprise the step of injecting an effective amount of one or more of the presently disclosed water treatment compositions into the aqueous medium after the one or more metal surfaces are pretreated with an effective amount of one or more of the presently disclosed water treatment compositions. According to this method, fouling of one or more surfaces of the metal housing will be mitigated.

In any aspects of the methods disclosed herein, the water treatment composition can comprise zinc, a dispersant comprising a mixture of polymaleic acid and a copolymer of acrylic acid and AMPS, and tolyltriazole, while excluding phosphorus. In any aspects, the water treatment composition can comprise about 4 ppm of zinc, about 3 ppm of a dispersant comprising a mixture of polymaleic acid and a copolymer of acrylic acid and AMPS, and about 4 ppm of tolyltriazole, while excluding phosphorus.

In any aspects of the methods disclosed herein, the water treatment composition can comprise zinc, a dispersant comprising a mixture of polymaleic acid and a copolymer of acrylic acid and AMPS, and a mixture of a butylbenzotriazole and tolyltriazole, while excluding phosphorus. In any aspects, the water treatment composition can comprise about 2 ppm zinc, about 3 ppm of a dispersant comprising a mixture of polymaleic acid and a copolymer of acrylic acid and AMPS, and about 4 ppm of a mixture of a butylbenzotriazole and tolyltriazole, while excluding phosphorus.

In accordance with any method disclosed herein, the aqueous medium can comprise any type of water. In certain aspects, the aqueous medium comprises recycling pond water.

The presently disclosed water treatment compositions can be injected into the aqueous medium by any means known in the art. For example, the compositions can be injected via a chemical metering pump into the aqueous medium. Any location of the system can be used as the point of addition, such as to the intake from the pond water or into a conduit transporting the water throughout the system. It can also be added to the inlet of the heat exchangers. Other acceptable methods of injection include pretreating the metal surfaces before exposure to the aqueous medium, continuous or intermittent injection, or batch treating. Continuous injection may be performed where appropriate chemical injection equipment is available in the field along with chemical storage tanks, otherwise the composition may be injected using a specialized treatment vehicle which applies a large chemical dosage at long time intervals, usually every one to two weeks, and in certain cases, monthly. Batch application may be performed through the use of a treating truck comprising a storage tank containing the presently disclosed water treatment compositions (and optionally other chemicals) and a large water tank. The treating truck travels to field locations and treats individual sites (see, for example, U.S. Pat. No. 4,964,468).

Moreover, any of the methods of the present disclosure can be carried out using an automated system. The system can include an on-line unit for measuring, controlling, and/or optimizing various water properties. Optimization can include measuring one or more properties associated with the water of the aqueous system to be sure that the one or more properties are within an acceptable range and, if the one or more properties are not within the acceptable range for each respective property being measured, causing a change in flow, such as an increase or decrease, of one or more of the presently disclosed compositions into the aqueous system.

In certain aspects, the system can include a monitoring and controlling unit that comprises a controller device and a plurality of sensors. Each of the plurality of sensors can be in communication with the controller. For example, if the unit comprises five sensors, each of the five sensors can be in communication with the controller. In certain aspects, the controller can be attached to a skid, or other type of support member. Further, the skid can be mounted inside of a mobile housing, such as a trailer. Thus, the monitoring and controlling unit can be mobile and moved around quite easily from site to site.

As used herein, the term "controller" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, Internet connection, microwave link, infrared link, wired network (e.g., Ethernet) and the like. In addition, other components such as a signal conditioner or system monitor may be included to facilitate signal transmission and signal-processing algorithms.

In certain aspects, the controller includes hierarchy logic to prioritize any measured or predicted properties associated with system parameters. For example, the controller may be programmed to prioritize system pH over ORP, or vice versa. It should be appreciated that the object of such hierarchy logic is to allow improved control over the system parameters and to avoid circular control loops.

In one aspect, the monitoring system and method associated therewith includes an automated controller. In another aspect, the controller is manual or semi-manual. For example, where the system includes one or more datasets received from various sensors in the system, the controller may either automatically determine which data points/datasets to further process or an operator may partially or fully make such a determination. A dataset for production water, for instance, may include variables or system parameters such as ORP, DO, pH, fluorescence, turbidity, concentrations of certain chemicals such as dispersants, azoles, temperature, pressure, flow rate, total dissolved or suspended solids, etc. Such system parameters are typically measured with any type of suitable data capturing equipment, such as sensors designed specifically for these parameters, for example pH sensors, ion analyzers, temperature sensors, thermocouples, pressure sensors, corrosion monitors, and/or any other suitable device or sensor. Data capturing equipment is in communication with the controller and, according to alternative embodiments, may have advanced functions (including any part of the control algorithms described herein) imparted by the controller.

Water to be used in these aqueous systems can be stored in a storage device. According to the present disclosure, a storage device can be, for example, a pond, a pipeline, or a similar device that could be used to store water. In certain aspects of the present disclosure, a sample of water from the aqueous system can be drawn from the system, through a side stream for example, and routed through the controller to take various measurements of the water's properties. For example, water from a pond can be routed through a pipeline into a heat exchanger for use in a hydrocarbon recovery process. A conduit can have a first end in fluid communication with the pipeline before the water enters the heat exchanger and a second end at an input location on the controller or an input location on the monitoring and controlling unit. The water can be pumped from the pond or pipeline, through the conduit, and into the controller device or monitoring and controlling unit.

The monitoring and controlling unit comprises a plurality of sensors, which are capable of analyzing the water samples and transmitting data regarding the samples to the controller. The plurality of sensors can comprise, for example, sensors for measuring conductivity, a corrosion monitor, fluorescence, pH, oxidation/reduction potential (ORP), biocide concentration, turbidity, temperature, flow, and dissolved oxygen (DO) in the water. The controller can comprise any of these sensors, all of these sensors, or a combination of two or more of these sensors, and in all aspects of this disclosure, the sensors can be in communication with the controller. Other types of sensors contemplated by the present disclosure can include, but are not limited to, oil in water sensors, total dissolved solids sensors, and total suspended solids sensors.

With respect to the sensor(s)/monitor used to measure corrosion, a corrosion monitor can be used that comprises a controller module that communicates with the controller of the monitoring and controlling unit, a sensor module which operably communicates with the controller module, and a resistor module which operably communicates with the controller module, wherein the resistor module is capable of identifying the probe module to the controller module. The corrosion monitor can comprise a probe or sensor module having at least one metallurgical sensor or probe electrode which operably communicates with the controller module, and a resistor module having a resistance value which operably communicates with the controller module, wherein the resistance value identifies the metallurgy of the sensor/probe electrode to the controller module. Additionally, the corrosion monitor can determine a corrosion rate according to the following steps: providing a corrosion monitoring device comprising a controller module, a probe module which operably communicates with the controller module, and a resistor module which operably communicates with the controller module, contacting the probe module with the water of the system, charging the probe module and resistor module with a current via the controller module, identifying the type of probe module by the controller module based upon the resistance value of the charged resistor module, determining the rate of corrosion by the controller module after the probe module has been identified, and sending this information to the controller of the monitoring and controlling unit. Further details of the corrosion monitor and the methods of monitoring corrosion can be found in U.S. Pat. No. 6,556,027, which is expressly incorporated herein by reference.

After the sample of water is pumped from a storage device and routed through the monitoring and controlling unit, a conduit is present that routes the water back to, for example, the particular storage device from where it came, a different storage device, or to waste. In this regard, if the storage device is a pond, then conduit would transport the water from the monitoring and controlling unit back to the pond. Thus, in certain aspects, the controller or monitoring and controlling unit can have a delivery conduit for bringing water into the monitoring and controlling unit for analysis and it can also have a return conduit, which serves to return the analyzed water back to a storage device or to waste.

The presently disclosed monitoring and controlling system can also comprise, in certain aspects, one or more chemical injection pumps. These chemical injection pumps can be in fluid communication with the storage device, or each storage device if there is more than one storage device. For example, if the storage device is a pond, then one or more chemical injection pumps can be in fluid communication with the pond. In one aspect, there could be a conduit running from the chemical injection pump into the pond. If necessary, the chemical injection pump could then supply a chemical through the conduit and into the storage device comprising system water. There can also be multiple chemical injection pumps and each pump can have a conduit running therefrom to the storage device, or each storage device, if there is more than one storage device comprising production water. Each different chemical injection pump can have a different chemical housed therein, so that based upon the measurements of the sample of water, one or more different chemicals could be added to the system water in the storage device to modify its properties. In other aspects, the chemical injection pumps do not need to comprise conduits for routing the chemical into the storage device hut instead may be located sufficiently close to the storage device so that they can simply release chemicals into the storage device in a manner similar to a faucet over a sink. Moreover, a chemical injection pump can comprise a conduit that leads directly into a pipeline transporting water in the aqueous system. In all aspects, the presently disclosed chemical injection pumps can be in communication with the controller, as will be described hereinafter in greater detail.

The disclosed monitoring and controlling system provides methods to generate real-time, on-line, reliable data from the water in the system. As previously mentioned, the water can be stored in a storage device, such as a pond, and a sample thereof can be taken from the storage device, routed through a conduit, and injected into the controller or monitoring and controlling unit, where it is analyzed by a plurality sensors. Based upon the data received by the controller from the plurality of sensors, chemical adjustments can be made to the production water.

For example, when the monitoring and controlling system comprises one or more chemical injection pumps, these chemical injection pumps can be in communication with the controller in any number of ways, including, as examples, through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In an aspect, the monitoring and controlling system is implemented to have the plurality of sensors provide continuous or intermittent feedback, feed-forward, or predictive information to the controller, which can relay this information to a relay device, such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps, to adjust the amount of chemical injection. Based upon the information received by the controller from the plurality of sensors or from the remote device, the controller can transmit signals to the various pumps to make automatic, real-time adjustments, to the amount of chemical that the pumps are injecting into the aqueous system.

Alternatively, an operator of the remote device that receives cellular communications from the controller can manually manipulate the pumps through the remote device. The operator can communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. This capability can be because preset parameters or programs can be inputted into the controller or remote device so that the controller or remote device can determine if a measured property is outside of an acceptable range and based on the information received by the plurality of sensors, the controller or remote device can make appropriate adjustments to the pumps or send out an appropriate alert because it has been programmed to do so.

In certain aspects, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured turbidity is above the acceptable range, the software allows the controller or remote device to make this determination and take remedial action, such as alerting a pump to increase the flow of one or more dispersants disclosed herein to the water.

The monitoring and controlling system and/or controller disclosed herein can incorporate programming logic to convert analyzer signals from the plurality of sensors to pump adjustment logic and, in certain embodiments, control one or more of a plurality of chemical injection pumps with a unique basis. Non-limiting, illustrative examples of the types of chemical injection pumps that can be manipulated include chemical injection pumps responsible for injecting dispersants, azoles, transition metals, sodium meta silicates, fluorescent tracers, quaternary ammonium salts, o-phosphate, phosphine succinate oligomers, biocides, scale inhibitors, friction reducers, acids, bases, sulfites, oxygen scavengers, and any other type of chemical that could prove to be useful. Particular examples of the foregoing chemicals have been provided throughout this disclosure and other examples not specifically recited herein are intended to be covered by the present disclosure.

The presently disclosed controller can manage and interpret readings of the water from the sensors, such as biocide concentration, fluorescence, dissolved oxygen (DO) content, conductivity, total dissolved solids (TDS), pH, oxidation/reduction potential (ORP), turbidity, corrosion, temperature, flow, oil in water, and total suspended solids. Sensors for all of these properties can be incorporated into the monitoring and controlling unit or sensors for any combination of these properties can be incorporated into the monitoring and controlling unit. For example, in certain aspects, the monitoring and controlling unit can include corrosion, turbidity, ORP, pH, and fluorescence sensors.

The readings from these sensors can be sent to and programmed through the controller, which can be, for example, a Programming Logic Controller (PLC), to possibly override or modify the chemical injection pump rates.

In an aspect, the disclosure provides a method for monitoring, controlling, and/or optimizing one or more properties of the water in the aqueous system. A property, such as ORP, pH, turbidity, etc., of the sample of water is measured and/or predicted, and is subsequently converted into an input signal, such as an electrical input signal, capable of being transmitted from a sensor to the controller. In turn, the controller is operable to receive the transmitted input signal, convert the received signal into an input numerical value, analyze the input numerical value, generate an output numerical value, convert the output numerical value into an output signal, such as an output electrical signal, and transmit the output signal to, for example, the remote communication device or one or more of the chemical injection pumps.

For example, an optimum or acceptable ORP range, pH range, turbidity range, etc., for the input numerical value can be determined and/or preselected and if the measured input numerical value for the specific property is outside of the optimum or acceptable range, the transmitted output signal to the chemical injection pump causes a change in an influx of a chemical into the aqueous system. The chemical is capable of adjusting the property associated with the system parameter in a manner to bring the input numerical value within the optimum or acceptable range. The foregoing process can be run initially on a sample of the water from the storage device and, if adjustments need to be made to the water based upon the initial input numerical value, the adjustments can be made to the various pumps and thereafter, the process can be conducted again to determine if the property of the water has been brought within the optimum or acceptable range.

The method is optionally repeated for a plurality of different system parameters, where each different system parameter has a unique associated property, or, alternatively, all system parameters can be analyzed concurrently by the plurality of sensors.

In certain aspects, as previously mentioned, the software associated with the controller or remote device can include acceptable parameters for various water properties or these acceptable parameters can be programmed into the controller or remote device, so that the controller or remote device will know if a particular measured property is within, or outside, an acceptable range. Acceptable ranges for various parameters of the present disclosure can be, for example, pH from about 4 to about 9, turbidity measured as total suspended solids in the range of about 50 to about 2000 PPM, and ORP range can be less than or equal to about 600 mV. These parameters directly or indirectly affect the corrosion and its inhibition. In order to achieve a target corrosion rate, corrosion inhibitor dose is adjusted by the controller based on the sensor input. The dose is determined based on the predetermined logic built into the PLC.

In any event, the controller and/or remote device can determine if any of the measured properties are outside of their acceptable range and the controller or remote device can make automatic remedial adjustments to bring this property of the water within the acceptable range. For example, if the measured turbidity is >about 100 PPM as total suspended solids, the controller or remote device can send a signal to a chemical injection pump to increase the chemical feed rate of one or more of the presently disclosed dispersants. As an additional illustrative example, if the measured ORP of the water is above about 200 mV, the controller or remote device can send a signal to a chemical injection pump (or multiple chemical injection pumps) to increase the flow rate of one or more of the presently disclosed azoles, transition metals, or sodium meta silicates to control the corrosion rate within the desired range. In a further illustrative example, corrosion monitor signals above the acceptable range of about 3 to about 5 MPY will cause the controller or remote device to send a signal to a chemical injection pump to increase the chemical feed rate of one or more of the presently disclosed corrosion inhibitors, such as one or more azoles, optionally one or more transition metals, and optionally a sodium meta silicate.

Moreover, fluorescent can be used in this system to either control the product feed with higher accuracy or to maintain certain residual of the polymer to maintain certain product residual for set performance based on the PLC.

As noted herein, the monitoring and controlling unit comprises a plurality of sensors operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum or acceptable range, generate an output numerical value, convert the output numerical value into an output signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

A production water control program can include components such as neutralizing chemicals, biocides, corrosion inhibitors, acids, bases, scale inhibitors, oxygen scavengers, friction reducers, dispersants, azoles, transition metals, etc. Such chemicals have been traditionally injected into the production water based upon measurements derived from grab samples of the production water that were analyzed in a lab. However, these types of measurements can lead to overdosing or under-dosing certain chemicals to the water, because a significant amount of time can lapse between taking the initial sample, bringing the sample to the lab for analysis, and returning to the field to treat the water. During this time period, the chemistry of the water in the storage device can be changed, either intentionally or naturally, and thus, the water tested in the laboratory will not be indicative of the water in the field. To overcome such problems, the present disclosure provides a mobile, on-line, real-time, automated method of monitoring the water and controlling its properties by chemical injection, without the need to measure water quality in a laboratory or other testing facility involving grab sampling techniques.

Data transmission of measured parameters or signals to chemical pumps, alarms, remote monitoring devices such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In an embodiment, system parameter information is received from the system and archived. In another embodiment, system parameter information is processed according to a timetable or schedule. In a further embodiment, system parameter information is immediately processed in real-time or substantially real-time. Such real-time reception may include, for example, "streaming data" over a computer network.

In certain embodiments, multiple water or system parameters, or other constituents present in the water, could be measured and/or analyzed. Representative measured parameters or constituents include chloride ion, strong or weak acids such as sulfuric, sulfurous, thiosulfurous, carbon dioxide, hydrogen sulfide, and organic acids, ammonia, various amines, and liquid or solid deposits. Various methods of measuring such parameters are contemplated and this disclosure is not limited to any particular method. Representative methods include, but are not limited to, those disclosed in U.S. Pat. No. 5,326,482, titled "On-Line Acid Monitor and Neutralizer Feed Control of the Overhead Water in Oil Refineries"; U.S. Pat. No. 5,324,665, titled "On-Line Method for Monitoring Chloride Levels in a Fluid Stream"; U.S. Pat. No. 5,302,253, titled "On-Line Acid Monitor and Neutralizer Feed Control of the Overhead Water in Oil Refineries," each of which is incorporated herein by reference in its entirety.

The chemicals to be added to the system and/or water, such as the acids, bases, biocides, scale inhibitors, azoles, transition metals, dispersants, etc., may be introduced to the system or water using any suitable type of chemical injection pump. Most commonly, positive displacement injection pumps are used and are powered either electrically or pneumatically. Continuous flow injection pumps can also be used to ensure specialty chemicals are adequately and accurately injected into the rapidly moving process stream. Though any suitable pump or delivery system may be used, exemplary pumps and pumping methods include those disclosed in U.S. Pat. No. 5,066,199, titled "Method for Injecting Treatment Chemicals Using a Constant Flow Positive Displacement Pumping Apparatus" and U.S. Pat. No. 5,195,879, titled "Improved Method for Injecting Treatment Chemicals Using a Constant Flow Positive Displacement Pumping Apparatus," each incorporated herein by reference in its entirety.

The chemicals to be added to the water can be added to the water at any location within the aqueous system. For example, the chemicals can be added into the water storage device or into a pipeline transporting water through the system.

It should be appreciated that an acceptable or optimal range for a particular parameter or property should be determined for each individual system. The optimum range for one system may vary considerably from that of another system. It is within the concept of this disclosure to cover any possible acceptable or optimum ranges for the contemplated system parameters or properties.

In some embodiments, changes in the chemical injection pumps are limited in frequency. In some aspects, adjustment limits are set at a maximum of 1 per 15 min and sequential adjustments in the same direction may not exceed 8, for example. In some embodiments, after 8 total adjustments or a change of 50% or 100%, the pump could be suspended for an amount of time (e.g., 2 or 4 hours) and alarm could be triggered. If such a situation is encountered, it is advantageous to trigger an alarm to alert an operator. Other limits, such as maximum pump output may also be implemented. It should be appreciated that it is within the scope of the invention to cause any number of adjustments in any direction without limitation. Such limits are applied as determined by the operator or as preset into the controller.

In accordance with an aspect of the present disclosure, an on-line, automatic method of monitoring and controlling one or more properties of water is provided. One or more properties means that the method can control or monitor one property of the water, two properties or the water, three, four, five, six properties of the production water, etc. As previously mentioned, the properties can be pH, ORP, fluorescence, turbidity, etc.

The method can comprise the step of (a) providing a storage device for the water. In certain aspects, more than one storage device can be provided, such as two storage devices or three storage devices. For example, the storage devices can be a pond or a pipeline.

The method can also comprise the step of (b) introducing water into the storage device (or storage devices). Moreover, the method includes the step of (c) providing a monitoring and controlling unit comprising a controller and a plurality of sensors in communication with the controller, wherein each of the plurality of sensors is operable to measure a property of the water. For example, in one aspect, the unit can comprise five sensors, e.g. a corrosion monitor/sensor, turbidity sensor, ORP sensor, pH sensor, and fluorescence sensor.

The method can further include the step of (d) providing one or more pumps, which are in communication with the controller, wherein the one or more pumps can comprise one or more chemical injection pumps. For example, a chemical injection pump can be provided that is operable to inject one or more dispersants into the water, a chemical injection pump can be provided that is operable to inject one or more azoles into the water, a chemical injection pump can be provided that is operable to inject one or more transition metals into the water, a chemical injection pump can be provided that is operable to inject a fluorescent tracer into the water, and/or a chemical injection pump can be provided that is operable to inject a sodium meta silicate into the water. Moreover, a chemical injection pump can comprise any combination of the foregoing chemicals. Thus, in one aspect, a chemical injection pump can comprise, and thus inject into the water, a mixture of one or more dispersants, one or more azoles, and one or more transition metals, such as zinc.

The method can also comprise the step of (e) inputting an acceptable range for each of the one or more properties of the water to be measured into the controller.

The method can also comprise the step of (f) providing a delivery conduit having a first end in fluid communication with the water storage device (such as submerged in a pond or connected to a wall of a pipeline) and a second end connected to an inlet of the monitoring and controlling unit.

The method can also comprise the step of (g) pumping a sample of water from the storage device(s) into the monitoring and controlling unit and (h) measuring one or more properties of the sample of water with the plurality of sensors.

Further, the method can comprise the step of (i) determining if the measured one or more properties of the sample of water is within the acceptable range inputted into the controller in step (e). This determining step can be automatically performed by the controller and in this step, the measured value for each measured property is compared to the acceptable range inputted for that specific property.

The method can also comprise the step (j) wherein a composition substantially free of phosphorus is added to the water by a chemical injection pump. In one aspect, the composition substantially free of phosphorus comprises one or more dispersants. In another aspect, the composition substantially free of phosphorus comprises one or more azoles. In yet another aspect, the composition substantially free of phosphorus comprises one or more azoles and one or more transition metals. In still another aspect, the composition substantially free of phosphorus comprises one or more azoles, one or more transition metals, and one or more dispersants. In any of these aspects, the composition is substantially free of phosphorus or completely excludes phosphorus.

The method can also comprise the step (k) wherein if the measured one or more properties is outside of the acceptable range associated with that property inputted in step (e), causing a change in an influx of a chemical into the water from the one or more chemical injection pumps, the chemical being capable of adjusting the measured property associated with the production water in a manner to bring the measured property within the acceptable range. For example, if the measured property of pH is higher than about 9, then a chemical injection pump can be signaled and caused to inject an acid into the production water, to bring the pH within the acceptable range of about 6 to about 9. As an additional example, if the measured property of turbidity is higher than the upper limit of the acceptable range, then a chemical injection pump can be signaled and caused to inject a dispersant into the water to lower the turbidity.

The method can also include step (l) wherein steps (a) to (k) are optionally repeated to determine if the one or more properties has been brought within the acceptable range inputted in step (e). If each measured property has been brought within the acceptable range for that measured property after any of steps (i), (j), (k), (l), then the water is suitable for its intended purpose and can be used in the system, such as by injecting it into a heat exchanger. However, if one or more measured properties are substantially outside of the inputted acceptable ranges thr those properties, and it would require a large amount of time or resources to bring the one or more properties within the acceptable range for that property, then that body of water can simply be diverted to waste.

All of the compositions, systems, and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The systems, devices, and logic described above, such as the controller, can be implement in many different ways in many different combinations of hardware, software, or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the controller may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

EXAMPLES

A common method of measuring corrosion rates is to expose a carefully weighed piece of the material, or a test coupon, to the corrosion environment for a known length of time, remove the coupon from the environment, clean it, and reweigh it. The mass of metal loss can thus be determined.

In the present examples, the inventor developed a system including a glass vessel which held 10 liters of water. The vessel was fitted with a thermostatically heated heater and a recirculating pump. Nine liters of water from a tailings pond was added into the glass vessel. Two carbon steel pre-weighed corrosion coupons were suspended in the glass vessel, submerged in the water. The thermostat was set to the desired temperature, which was between about 25 and about 80° C. The test was run for 14 days and during that time, the volume of water in the vessel was maintained by adding distilled water to compensate for any evaporation, especially at higher temperatures.

The procedure described included multiple glass vessels. One of the vessels contained no corrosion inhibitor, while the other vessels were dosed with different inhibitors or water treatment compositions, as described in the present disclosure, at different dosages.

The water treatment compositions included in each vessel, as well as their amounts, are specifically listed in Table 1 where:

Dispersant 1=a composition that is a mixture of 18% polymaleic acid dispersant and 12% copolymer dispersant of acrylic acid and AMPS;

Azole 1=tolyltriazole with 42.8% azole as the sodium salt;

Dispersant 2=a copolymer dispersant of acrylic acid and hydroxypolyethoxy (10) allyl ether; and Azole 2=a mixture of butylbenzotriazole and tolyltriazole.

At the end of the 14 days, the test coupons were taken out, cleaned, and dried to a constant weight. The weights of the coupons were recorded to determine the corrosion rate and the effectiveness of the corrosion inhibitors/water treatment compositions. Data from these experiments can be seen in the following Table 1:

| Cell # | Treatment | Corrosion rate MPY* | % Corrosion Protection |
|---|---|---|---|
| 1 | Control with no inhibitor added | 27.21 | 0 |
| 2 | Dispersant 1 @ 15 PPM | 21.44 | 21 |
| 3 | Blend of quaternary ammonium salts @ 75 PPM | 28.16 | 0 |
| 4 | Blend of quaternary ammonium salts @ 50 PPM + Dispersant 1 @ 7.5 PPM | 21.65 | 20 |
| 5 | Blend of quaternary ammonium salts (100 PPM pre-passivation for 48 Hours) @ 10 PPM | 17.6 | 35 |
| 6 | Azole 1 @ 20 PPM | 8.17 | 70 |
| 7 | Sodium meta silicate @ 150 PPM + Dispersant 2 @ 12 PPM | 18.87 | 31 |
| 8 | Sodium meta silicate @ 100 PPM + Dispersant 2 @ 8 PPM + Azole 1 @ 10 PPM | 9.3 | 66 |
| 9 | Mixture of Zn, o-phosphate, and phosphine succinate oligomer @ 25 PPM + copolymer of acrylic acid and sulfonated acrylamide @ 4 PPM | 5.2 | 80 |
| 10 | 4 PPM Zn + Dispersant 1 @ 4 PPM + Azole 1 @ 4 PPM | 10.20 | 63 |
| 11 | 4 PPM Zn + Dispersant 1 @ 3 PPM | 18.71 | 31 |
| 12 | Azole 1 @ 4 PPM + Dispersant 1 @ 3 PPM | 18.23 | 33 |
| 13 | Azole 1 @ 4 PPM + Dispersant 1 @ 3 PPM + 2 PPM Zn | 11.41 | 58 |
| 14 | Azole 2 @ 3 PPM + Dispersant 1 @ 3 PPM | 8.09 | 70 |
| 15 | Azole 2 @ 2 ppm + Dispersant 1 @ 3 ppm + 4 ppm Zn | 7.9 | 71 |
| 16 | Azole 2 @ 3 ppm + Dispersant 1 @ 3 ppm + 4 ppm Zn | 7.1 | 74 |

Each cell number listed in Table 1 represents a different glass vessel. In total, there were 16 glass vessels, each of which had a test coupon suspended therein and each had a different combination of treatment chemicals therein except for cell number 1, which had no treatment chemical or inhibitor added. As can be seen, the presently disclosed water treatment compositions provided excellent corrosion protection.

With respect to cell number 6, this cell included 20 ppm of Azole 1 as a water treatment composition. This water treatment composition provided a corrosion rate of 8.17 MPY and provided corrosion protection of 70%. Compare the results of cell number 6 with the results of cell number 10. Cell number 10 included a water treatment composition comprising 4 ppm of zinc, 4 ppm of a mixture of Dispersant 1 and 4 ppm of Azole 1. This water treatment composition provided a corrosion rate of 10.2 MPY and provided corrosion protection of 63%. Although these results were slightly weaker than the results obtained in cell number 6, a significantly less amount of Azole 1 was used (i.e. 20 ppm in cell 6 and 4 ppm in cell 10). From this data, as well as the data collected from the remaining cells, it was unexpectedly discovered that there is a synergistic effect between the azoles and zinc. Thus, if zinc is included, or any other transition metal, in the water treatment composition, much less azole is required to produce similar results that would be achieved with a large amount (e.g. 20 ppm) of azole.

In order to test the fouling mitigation effectiveness of the presently disclosed water treatment compositions, the following procedures were followed. Microbalance technology using a quartz crystal was used to determine the efficacy of the water treatment compositions for fouling mitigation. This technique was used both in line to measure online fouling and in a batch process. One liter of the tailing pond water was added to a container which was heated by a hot plate that was thermostatically controlled to a desired temperature. The water was also stirred using a magnetic stirrer. In one experiment, 3 ppm of Dispersant 1 was added to the water. In a control experiment, no dispersant was added to the water. The microbalance probe was immersed in the water from the top. The microbalance recorded the vibration frequency which was calibrated to convert vibration frequency of the quartz crystal into weight gain on the quartz crystal. The higher the weight gain, the higher the fouling. The results are shown in FIG. 1.

As can be seen, after a period of about 2 hours, weight gain for the trial run with 3 ppm of Dispersant 1 remained almost constant, and was significantly lower than the weight gained over time in the trial run without 3 ppm of Dispersant 1.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for mitigating corrosion or fouling of a surface in an aqueous system comprising:
   (a) introducing an aqueous medium into a housing having at least one metal surface; and
   (b) injecting a water treatment composition comprising an effective amount of one or more azole compounds, an effective amount of one or more transition metals, and an effective amount of one or more dispersants into said aqueous medium, wherein said water treatment composition does not comprise phosphorus;
   (c) optionally wherein the method is an on-line, automated method comprising a monitoring and controlling unit and one or more chemical injection pumps.

2. The method of claim 1, wherein before step (a), said method further comprises the step of pretreating the at least one metal surface with a water treatment composition comprising an effective amount of one or more azole compounds, an effective amount of one or more transition metals, and an effective amount of one or more dispersants, wherein said water treatment composition does not comprise phosphorus.

3. The method of claim 2, wherein said one or more dispersants is selected from the group consisting of a copolymer comprising acrylic acid, and a copolymer comprising acrylic acid and 2-acrylamido-2-methylpropane sulfonic acid, said one or more transition metals comprises zinc, and said one or more azole compounds is selected from the group consisting of tolytriazole, and a mixture of tolyltriazole with a butylbenzotriazole.

4. The method of claim 2, wherein said effective amount of one or more azole compounds is from about 2 ppm to about 20 ppm, said effective amount of one or more transition metals is from about 2 ppm to about 4 ppm, and said effective amount of one or more dispersants is from about 2 ppm to about 20 ppm.

5. The method of claim 1, wherein said at least one metal surface comprises copper or a copper alloy.

6. The method of claim 1, wherein said effective amount of one or more azole compounds is from about 2 ppm to about 20 ppm, said effective amount of one or more transition metals is from about 2 ppm to about 4 ppm, and said effective amount of one or more dispersants is from about 2 ppm to about 20 ppm.

7. The method of claim 1, wherein said one or more dispersants is selected from the group consisting of a copolymer comprising acrylic acid, and a copolymer comprising acrylic acid and 2-acrylamido-2-methylpropane sulfonic acid, said one or more transition metals comprises zinc, and said one or more azole compounds is selected from the group consisting of tolytriazole, and a mixture of tolyltriazole with a butylbenzotriazole.

8. The method of claim 1, wherein said one or more dispersants comprises a mixture of polymaleic acid and a copolymer comprising acrylic acid and 2-acrylamido-2-methylpropane sulfonic acid in an amount of about 3 ppm, said one or more transition metals comprises zinc in an amount of about 4 ppm, and said one or more azole compounds comprises a mixture of butylbenzotriazole and tolyltriazole in an amount of about 3 ppm.

9. The method of claim 1 wherein the method is an on-line, automated method comprising a monitoring and controlling unit and one or more chemical injection pumps.

10. The method of claim 9, wherein before step (a), said method further comprises the step of pretreating the at least one metal surface with a water treatment composition comprising an effective amount of one or more azole compounds, an effective amount of one or more transition metals, and an effective amount of one or more dispersants, wherein said water treatment composition does not comprise phosphorus.

11. The method of claim 10, wherein said one or more dispersants is selected from the group consisting of a copolymer comprising acrylic acid, and a copolymer comprising acrylic acid and 2-acrylamido-2-methylpropane sulfonic acid, said one or more transition metals comprises zinc, and said one or more azole compounds is selected from the group consisting of tolyltriazole, and a mixture of tolyltriazole with a butylbenzotriazole.

12. The method of claim 10, wherein said effective amount of one or more azole compounds is from about 2 ppm to about 20 ppm, said effective amount of one or more transition metals is from about 2 ppm to about 4 ppm, and said effective amount of one or more dispersants is from about 2 ppm to about 20 ppm.

13. The method of claim 9, wherein said at least one metal surface comprises copper or a copper alloy.

14. The method of claim 9, wherein said effective amount of one or more azole compounds is from about 2 ppm to about 20 ppm, said effective amount of one or more transition metals is from about 2 ppm to about 4 ppm, and said effective amount of one or more dispersants is from about 2 ppm to about 20 ppm.

15. The method of claim 9, wherein said one or more dispersants is selected from the group consisting of a copolymer comprising acrylic acid, and a copolymer comprising acrylic acid and 2-acrylamido-2-methylpropane sulfonic acid, said one or more transition metals comprises zinc, and said one or more azole compounds is selected from the group consisting of tolytriazole, and a mixture of tolyltriazole with a butylbenzotriazole.

16. The method of claim 9, wherein said one or more dispersants comprises a mixture of polymaleic acid and a copolymer comprising acrylic acid and 2-acrylamido-2-methylpropane sulfonic acid in an amount of about 3 ppm, said one or more transition metals comprises zinc in an amount of about 4 ppm, and said one or more azole compounds comprises a mixture of butylbenzotriazole and tolyltriazole in an amount of about 3 ppm.

17. The method of claim 1 wherein the aqueous medium comprises pond water.

18. The method of claim 17 wherein the pond water is used in oil sands operations.

19. A method of monitoring and controlling one or more properties of water comprising:
(a) introducing water into a storage device;
(b) pumping a sample of water from the storage device into a monitoring and controlling unit, the monitoring and controlling unit comprising a controller and a plurality of sensors in communication with the controller, wherein each of the plurality of sensors is operable to measure a property of the water; wherein one or more pumps are in communication with the controller, wherein the one or more pumps can comprise one or more chemical injection pumps; and wherein a delivery conduit has a first end in communication with the water and a second end connected to an inlet of the monitoring and controlling unit;
(c) inputting an acceptable range for each of the one or more properties of the water to be measured into the controller;
(d) measuring one or more properties of the sample of water with the plurality of sensors;
(e) adding a water treatment composition substantially free of phosphorus to the water via a chemical injection pump;
(f) determining if the measured one or more properties of the sample of production water is within the acceptable range inputted into the controller in step (c); wherein
(g) if the measured one or more properties is outside of the acceptable range associated with that property inputted in step (c), causing a change in an influx of a chemical into the water from the one or more chemical injection pumps, the chemical being capable of adjusting the measured property associated with the water in a manner to bring the measured property within the acceptable range; and
(h) optionally repeating steps (a) to (f) to determine if the one or more properties has been brought within the acceptable range inputted in step (c).

* * * * *